United States Patent
Li et al.

(10) Patent No.: US 7,327,540 B2
(45) Date of Patent: Feb. 5, 2008

(54) HARD BIASED MATERIALS FOR RECORDING HEAD APPLICATIONS

(75) Inventors: Yun-Fei Li, Fremont, CA (US); Kunliang Zhang, Santa Clara, CA (US); Chyu-Jiuh Torng, Pleasanton, CA (US)

(73) Assignee: Headway Technologies, Inc., Milpitas, CA (US)

( * ) Notice: Subject to any disclaimer, the term of this patent is extended or adjusted under 35 U.S.C. 154(b) by 497 days.

(21) Appl. No.: 10/858,029

(22) Filed: Jun. 1, 2004

(65) Prior Publication Data

US 2005/0264957 A1 Dec. 1, 2005

(51) Int. Cl.
*G11B 5/33* (2006.01)
*G11B 5/127* (2006.01)
*G11B 5/39* (2006.01)

(52) U.S. Cl. ............... 360/324.12; 360/324; 428/810; 428/812

(58) Field of Classification Search .... 360/324–327.33
See application file for complete search history.

(56) References Cited

U.S. PATENT DOCUMENTS

| | | | | |
|---|---|---|---|---|
| 5,491,600 A | * | 2/1996 | Chen et al. .................. 360/322 |
| 5,532,109 A | * | 7/1996 | Krounbi et al. ........... 430/271.1 |
| 6,122,151 A | | 9/2000 | Saito et al. ............. 360/324.12 |
| 6,219,207 B1 | * | 4/2001 | Pinarbasi ..................... 360/322 |
| 6,291,087 B1 | * | 9/2001 | Xiao et al. ................ 428/811.2 |
| 6,292,336 B1 | * | 9/2001 | Horng et al. ........... 360/324.12 |
| 6,462,920 B1 | | 10/2002 | Karimi ................... 360/327.31 |
| 6,466,418 B1 | * | 10/2002 | Horng et al. ........... 360/324.12 |
| 6,608,740 B2 | | 8/2003 | Tanaka et al. .......... 360/324.12 |
| 6,636,460 B2 | | 10/2003 | Akiyama et al. ........ 369/13.14 |
| 6,668,443 B2 | | 12/2003 | Chien et al. ............. 29/603.18 |
| 7,035,061 B2 | * | 4/2006 | Singleton et al. ...... 360/324.12 |

(Continued)

FOREIGN PATENT DOCUMENTS

WO    WO 03105163 A1 *  12/2003

OTHER PUBLICATIONS

D. Weller, "Extremely High Density Longitudinal Magnetic Recording Media," Ann. Rev. Material Sci., vol. 30, pp. 611-644 (2000).

(Continued)

*Primary Examiner*—Andrea Wellington
*Assistant Examiner*—Jason M. Garr
(74) *Attorney, Agent, or Firm*—Saile Ackerman LLC; Stephen B. Ackerman

(57) ABSTRACT

A hard bias layer that forms an abutting junction with a free layer in a GMR element and is comprised of FePtCu or FePtCuX where X is B, C, O, Si, or N is disclosed. The FePtCu layer has a composition of about 45 atomic % Fe, 45 atomic % Pt, and 10 atomic % Cu and does not require a seed layer to achieve an ordered structure. The FePtCu layer is annealed at a temperature of about 280° C. and has an Hc value more than double that of a conventional CoCrPt hard bias layer with a similar thickness. Since the FePtCu hard bias layer adjoins a free layer, it has a higher sensor edge pinning efficiency than a configuration with a CoCrPt layer on a seed layer. The novel hard bias layer is compatible with either a top or bottom spin valve structure in a GMR sensor.

24 Claims, 2 Drawing Sheets

U.S. PATENT DOCUMENTS

| | | | |
|---|---|---|---|
| 2001/0006446 A1* | 7/2001 | Aoki et al. | 360/324.12 |
| 2001/0051287 A1* | 12/2001 | Kikitsu et al. | 428/694 ML |
| 2002/0015268 A1* | 2/2002 | Mao et al. | 360/324.12 |
| 2002/0036919 A1* | 3/2002 | Daughton et al. | 365/173 |
| 2002/0057156 A1* | 5/2002 | Czimmek | 336/30 |
| 2002/0135948 A1* | 9/2002 | Funayama et al. | 360/324.1 |
| 2003/0228488 A1* | 12/2003 | Covington et al. | 428/692 |
| 2004/0042133 A1* | 3/2004 | Parker | 360/327.3 |
| 2004/0047089 A1* | 3/2004 | Singleton et al. | 360/327.31 |
| 2004/0246776 A1* | 12/2004 | Covington | 365/173 |
| 2006/0254924 A1* | 11/2006 | Ichihara et al. | 205/255 |

OTHER PUBLICATIONS

T. Maeda et al., "Reduction of ordering temperature of an FePt ordered alloy by addition of Cu," Appl. Phy. Lett., vol. 80, No. 12, pp. 2147-2149, (2000).

U.S. Appl. No. Pub. US 2002/0015268 A1 to Mao et al., Pub. Date Feb. 7, 2002, Filed Mar. 23, 2001, US Cl. 360/324.12.

U.S. Appl. No. Pub. US 2003/0193758 A1 to Hiramoto et al, Pub. Date Oct. 16, 2003, Filed May 20, 2003, USCl. 360/321.

* cited by examiner

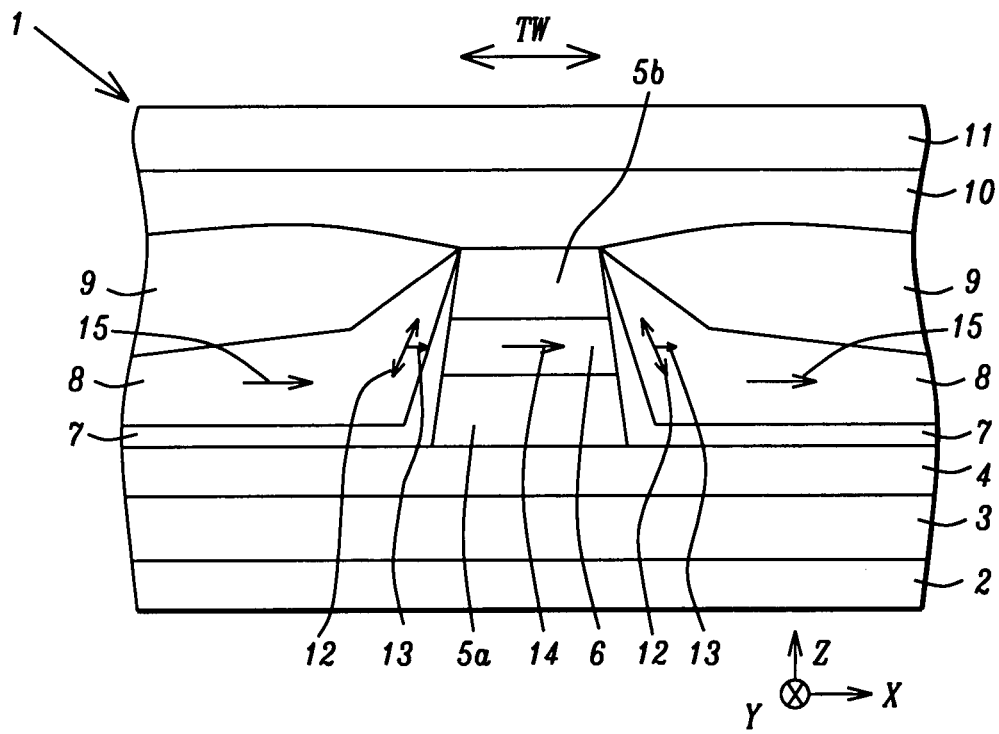
FIG. 1 – Prior Art
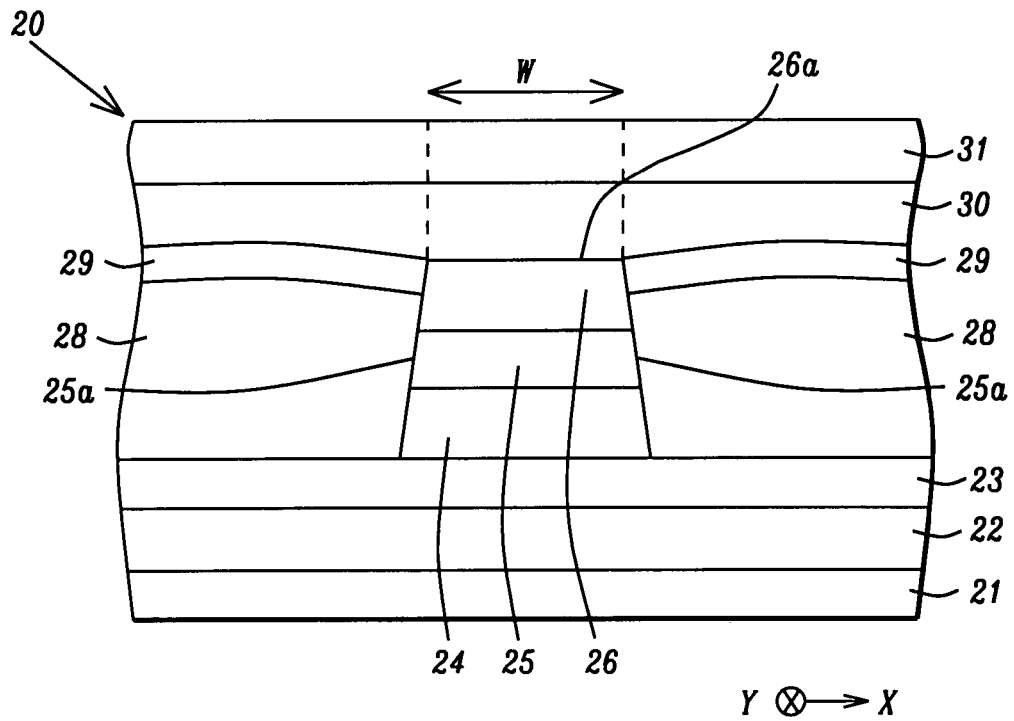
FIG. 2

HARD BIASED MATERIALS FOR RECORDING HEAD APPLICATIONS

FIELD OF THE INVENTION

The invention relates to the fabrication of a giant magnetoresistive (GMR) sensor in a magnetic read head and in particular to an improved hard bias material having a high coercivity and sensor edge pinning efficiency that does not require a seed layer.

BACKGROUND OF THE INVENTION

A magnetic disk drive includes circular data tracks on a rotating magnetic disk and read and write heads that may form a merged head attached to a slider on a positioning arm. During a read or write operation, the merged head is suspended over the magnetic disk on an air bearing surface (ABS). The sensor in a read head is a critical component since it is used to detect magnetic field signals by a resistance change. One form of magnetoresistance is a spin valve magnetoresistance (SVMR) or giant magnetoresistance (GMR) which is based on a configuration in which two ferromagnetic layers are separated by a non-magnetic conductive layer in the sensor stack. One of the ferromagnetic layers is a pinned layer in which the magnetization direction is fixed by exchange coupling with an adjacent anti-ferromagnetic (AFM) pinning layer. The second ferromagnetic layer is a free layer in which the magnetization vector can rotate in response to external magnetic fields. The rotation of magnetization in the free layer relative to the fixed layer magnetization generates a resistance change that is detected as a voltage change when a sense current is passed through the structure. In a CPP configuration, a sense current is passed through the sensor in a direction perpendicular to the layers in the stack. Alternatively, there is a current-in-plane (CIP) configuration where the sense current passes through the sensor in a direction parallel to the planes of the layers in the sensor stack.

Ultra-high density (over 100 Gb/in$^2$) recording requires a highly sensitive read head in which the sensor is typically smaller than 0.1×0.1 microns at the ABS plane. Current recording head applications are still mainly based on an abutting junction configuration in which a hard bias layer is formed adjacent to each side of a GMR spin valve structure. As the recording density further increases and track width decreases, the junction edge stability becomes more important. A problem occurs when an edge demagnification effect leads to hard bias magnetization canting in which the in-plane magnetization vector in the hard bias layer is partially shunted away from the free layer. It is desirable to minimize this effect to achieve a better biasing direction. To achieve this objective, a higher hard bias coercivity is beneficial. Coercivity is defined as a measure of an opposing magnetic intensity which is required to remove a residual magnetism in a material that has been magnetized to saturation.

Referring to FIG. 1, a conventional read head 1 based on a GMR configuration is shown and is comprised of a substrate 2 upon which a first shield 3 and a first gap layer 4 are formed. There is a GMR element comprised of a bottom portion 5a, a free layer 6, and a top portion 5b formed on the first gap layer 4. Note that the GMR element generally has sloped sidewalls wherein the top portion 5b is not as wide as the bottom portion 5a. In addition, the GMR element may be a bottom spin valve in which an AFM pinning layer and pinned layer (not shown) are below the free layer 6 or the GMR element may be a top spin valve where the AFM and pinned layers are above the free layer. There is a seed layer 7 formed on the first gap layer 4 and along the GMR element which ensures that the subsequently deposited hard bias layers 8 have a proper microstructure. Leads 9 are provided on the hard bias layers 8 to carry current to and from the GMR element. The distance between the leads 9 defines the track width TW of the read head 1. Above the leads 9 and GMR element are successively formed a second gap layer 10 and a second shield 11.

The pinned layer in the GMR element is pinned in the Y direction by exchange coupling with an adjacent AFM layer that is magnetized in the Y direction by an annealing process. The hard bias layers 8 which are comprised of a material such as CoCrPt are magnetized in the X direction as depicted by vectors 15 and influence an X directional alignment of the magnetic vector 14 in the free layer 6. When a magnetic field of sufficient strength is applied in the Y direction from a recording medium by moving the head 1 over a hard disk (not shown) in the Z direction, then the magnetization in the free layer switches to the Y direction. This change in magnetic state is sensed by a voltage change due to a drop in the electrical resistance for an electrical current that is passed through the MR element. Unfortunately, as track width becomes smaller to enable increased recording density, the magnetization in the hard bias layers 8 tends to be shunted along the interface with the seed layer 7 near the junction with the GMR element. The loss of magnetization in the X direction represented by the vectors 12 causes a weakening in the magnetic coupling between the hard bias layers 8 and the free layer 6. Thus, the hard bias layers 8 may not provide sufficient longitudinal bias to stabilize the free layer 6 to achieve a single magnetic domain and undesirable Barkhausen noise may result. In order to overcome this condition, a hard bias layer with higher coercivity is needed.

Another concern with the conventional read head 1 is that the seed layer 7 may be non-magnetic and thereby weakens the magnetic coupling between the hard bias layers 8 and the free layer 6. Even when the seed layer 7 is magnetic, its coercivity is usually less than the hard bias layer which degrades device performance. Thus, a hard bias layer that does not require a seed layer and can be formed adjacent to a free layer in a magnetic read head is desirable.

The in-plane remnant magnetization (Mr) of the hard bias layers 8 represented by the vectors 13 in FIG. 1 must be higher than the Mr of the free layer 6 or the hard bias layers will not be able to stabilize the free layer and guarantee a single magnetic domain. The saturation magnetization (Ms) of the hard bias layers 8 is in the X direction. It follows that Ms and the squareness S=Mr/Ms of the hysteresis loop of the hard bias layer 8 along the in-plane (X direction) must be high for optimized performance of the read head 1.

Another requirement for the material in the hard bias layers 8 is that formation of an ordered microstructure is accomplished within a temperature range that does not affect the stability of the GMR element. Preferably, the deposition of the hard bias layer and subsequent annealing are performed at temperatures about 300° C. or less. This requirement precludes the implementation of ordered L10 type FePt or CoPt based materials that have a higher intrinsic magnetocrystalline anisotropy than currently used CoCrPt hard bias layers which have an Hc of about 2000 Oe as described by D. Weller in "Extremely High Density Longitudinal Magnetic Recording Media" found in Ann. Rev. Material Sci., Vol. 30, p. 611 (2000). It is noted that a standard FePt ordered structure requires a high temperature deposition (>400° C.) or high temperature anneal (>500° C.) that is not compatible with current recording head fabrication schemes. T. Maeda et al. in "Reduction of ordering temperature of an FePt ordered alloy by addition of Cu" in Applied Phy. Lett., Vol. 80, No. 12, p. 2147 (2002) report that the ordering temperature of FePt may be lowered to near 300° C. by adding a Cu dopant.

In U.S. Patent Application 2002/015268, a TiW seed layer is used to increase the Hc of an overlying FePt hard bias layer. Other body centered cubic (bcc) seed layers may be employed including a composite Cr/TiW seed layer. A FePt alloy is also used as a hard bias layer in U.S. Patent Application 2003/0193758. However, no conditions are provided in either publication for depositing or annealing the hard bias layer.

In U.S. Pat. No. 6,668,443, a NiCr smoothing layer is deposited on a substrate adjacent to a bottom spin valve. A seed layer may be formed on the NiCr layer. The smooth NiCr layer removes structural distortion in a subsequently deposited hard bias layer that results in improved longitudinal bias performance.

A Cr bias underlayer having a bcc lattice structure is disclosed in U.S. Pat. No. 6,608,740 and is formed between a CoCrPt hard bias layer and an MR element. This configuration provides the hard bias layer with a larger coercive force and a higher remanence ratio.

In U.S. Pat. No. 6,122,151, a hard bias layer such as CoCrPt is formed on a non-magnetic layer that is on a pinned layer in an MR element. The hard bias layer contacts the sides of the free layer. The non-magnetic layer is a metal layer such as Cr, Ti, Mo, or W. Optionally, the metal layer is a copper spacer layer in the MR element. An increase in coercivity, squareness ratio S, and bias magnetic field is observed. A method of reducing MR head instability is described in U.S. Pat. No. 6,462,920 and involves depositing a seed layer on a gap layer but not along the side of an MR element. A hard bias layer is formed on the seed layer and contacts the sides of the MR element to improve magnetic coupling therebetween.

SUMMARY OF THE INVENTION

One objective of the present invention is to provide a material in a hard bias layer that has a higher coercivity and sensor edge pinning efficiency than current hard bias layers based on CoCrPt.

A further objective of the present invention is to provide a hard bias layer that does not require an underlying seed layer so that a direct contact is made between the hard bias layer and an adjacent free layer in order to maximize magnetic coupling.

A still further objective of the present invention is to provide a hard bias layer that can achieve an ordered structure at a temperature below about 300° C.

Yet another objective is to provide a method of forming the hard bias layer in a magnetic read head according to the previous objectives.

The first three objectives are achieved in a first embodiment in which a GMR element with sidewalls and a top surface is formed on a first gap layer above a first shield on a substrate in a magnetic read head. The GMR element may be a top spin valve or a bottom spin valve structure that is formed along an ABS plane and is comprised of an AFM layer, a pinned layer, and a free layer. The pinned layer is pinned in a first direction perpendicular to the ABS plane and parallel to the top surface of the substrate by exchange coupling with the magnetized AFM layer. A hard bias layer is formed on the gap layer on each side of the GMR element and contacts a substantial portion of the sidewalls in the GMR element to form abutting junctions with the free layer. The hard bias layer is comprised of FePtCu or FePtCuX where x=B, C, O, Si, or N and which has an ordering temperature of about 300° C. and is magnetized in a direction orthogonal to that of the pinned layer and parallel to the top surface of the substrate. The hard bias layer is magnetically coupled to the free layer and provides a longitudinal (in-plane) bias that enables a single magnetic domain within the free layer. Electrical leads are formed above the hard bias layer and contact the GMR element along its sidewalls near the top surface. A second gap layer is formed on the leads and on the GMR element and a second shield is formed on the second gap layer to complete the magnetic read head.

In a second embodiment, a GMR element is formed on a first gap layer above a first shield and substrate. The GMR element is comprised of a stack of layers in which a bottom portion is fabricated by sequentially forming a seed layer, an AFM layer, a pinned layer, a spacer, and a lower portion of a free layer on the first gap layer. A top portion of the GMR element has a width which is about equivalent to a track width and is substantially less than the width of the bottom portion. The top portion of the GMR element is comprised of the upper portion of the free layer and a cap layer formed thereon. There is a hard bias layer disposed on the lower portion of the free layer and along each side of the upper portion of the free layer and cap layer. The hard bias layer is comprised of FePtCu or FePtCuX where x=B, C, O, Si, or N and is magnetized in a direction orthogonal to the magnetization direction of the pinned layer and parallel to the top surface of the substrate. The hard bias layer is magnetically coupled to the free layer and provides a longitudinal (in-plane) bias that enables a single magnetic domain within the free layer. Electrical leads are formed above the hard bias layer and contact the GMR element along its top surface. There is a space between the leads that defines the track width of the magnetic read head. A second gap layer is formed on the leads and on the GMR element and a second shield is formed on the second gap layer to complete the magnetic read head.

The present invention is also a method of forming a magnetic head comprised of an improved hard bias layer according to the first and second embodiments. A stack of GMR layers comprised of a free layer, pinned layer, an AFM layer, and a cap layer is formed on a first gap layer on a substrate. A photoresist mask is patterned above the cap layer in the GMR stack. Ion beam milling or reactive ion etching is used to etch through the exposed regions of the GMR stack to define a GMR element and a track width. In one embodiment, the ion beam etching continues through the entire GMR stack and stops on the first gap layer. Alternatively, the ion beam etching removes exposed regions of the cap layer and a top portion of the free layer. A key feature is that a hard bias layer comprised of FePtCu or FePtCuX where x=B, C, O, Si, or N is deposited by a magnetron sputtering process or an ion beam deposition (IBD) method to form an abutting junction with the free layer on each side of the GMR element. Electrical leads are subsequently formed on the hard bias layer by a conventional method. The photoresist layer is then removed by a lift-off process, for example. The second gap layer and second shield are sequentially formed on the electrical leads and GMR element by well known methods.

BRIEF DESCRIPTION OF THE DRAWINGS

FIG. 1 is a cross-sectional view showing a prior art magnetic read head with a GMR element, a seed layer formed on a gap layer and along the sidewalls of the GMR element, and a hard bias layer comprised of CoCrPt or the like on the seed layer.

FIG. 2 is a cross-sectional view of a magnetic read head in which a hard bias layer comprised of FePtCu or FePtCuX where x=B, C, O, Si, or N is formed adjacent to a free layer in a GMR element according to a first embodiment of the present invention.

DETAILED DESCRIPTION OF THE INVENTION

Figure 3:
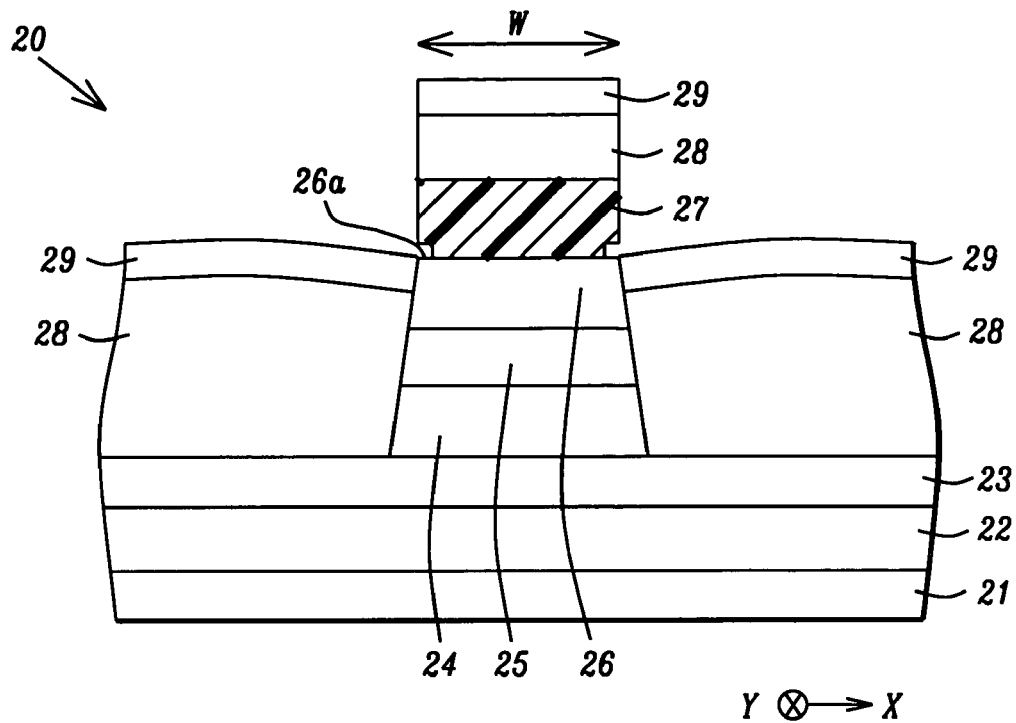
FIG. 3 is a cross-sectional view that shows an intermediate step in the method of forming the hard bias layers according to the first embodiment.

The present invention is an improved hard bias layer in a magnetic read head that has a higher coercivity and better sensor edge pinning efficiency than conventional hard bias layers comprised of CoCrPt. The hard bias layer and resulting read head are especially suited for an ultra-high density magnetic recording device wherein the recording density is greater than about 100 Gbits/in$^2$. The drawings are provided by way of example and are not intended to limit the scope of the invention. Although the magnetoresistive (MR) element is shown as a GMR element, the present invention is equally applicable to other types of MR elements. Furthermore, the shape of a GMR element in the read head is not a limitation and the invention also applies to any configuration where a hard bias layer forms an abutting junction with a free layer in a spin valve structure. The present invention is also a method of forming a magnetic read head with a hard bias layer having a high coercivity, a high squareness value (MrI/Ms), and a high in-plane flux density.

A first embodiment is depicted in FIG. 2 in which a magnetic read head is comprised of a GMR element and a novel hard bias layer which forms an abutting junction with a free layer in the GMR element. The GMR element may be comprised of either a top spin valve or a bottom spin valve.

Referring to FIG. 2, a cross-sectional view from an ABS plane is shown of a magnetic read head 20 which has a substrate 21 that may be a ceramic layer, for example. A first shield 22 is formed on the substrate 21 and a first gap layer 23 is formed on the first shield. There is a GMR element comprised of a bottom portion 24, a free layer 25, and a top portion 26 sequentially formed on the first gap layer 23. The GMR element typically has sloped sidewalls wherein the top portion 26 has a smaller width than the bottom portion 24. The GMR element has a total thickness of about 100 to 500 Angstroms.

In one embodiment that represents a bottom spin valve, the bottom portion 24 is comprised of a seed layer such as NiCr on which an anti-ferromagnetic (AFM) pinning layer, a pinned layer, and a spacer layer which may be Cu are sequentially formed. The individual layers within the bottom portion 24 are not shown in order to simplify the drawing and direct attention to the abutting junction between the free layer 25 and the adjoining hard bias layers 28. The AFM layer may be a MnPt or MnIr layer that is magnetized in the y direction. The pinned layer that may be comprised of CoFe is pinned in the y direction by exchange coupling with the AFM layer. Optionally, the pinned layer may have a synthetic anti-parallel (SyAP) configuration in which a coupling layer such as Ru is sandwiched between an AP2 pinned layer on the AFM layer and an overlying AP1 pinned layer. The AP2 layer has a magnetic moment or vector oriented in the y direction by exchange coupling with an AFM pinning layer. The AP1 layer is adjacent to the spacer and is anti-parallel exchange coupled to the AP2 layer via the coupling layer. Thus, the magnetic moment or vector of the AP1 pinned layer is oriented in the "−y" direction that is anti-parallel to the magnetic vector of the AP2 layer. The magnetic moments of the AP2 and AP1 layers combine to produce a net magnetic moment that is less than the magnetic moment of a single pinned layer. A small net magnetic moment results in improved exchange coupling between the AP2 layer and the AFM layer and also reduces interlayer coupling between the AP1 layer and the free layer 25.

The free layer 25 may be comprised of CoFe and/or NiFe and has a thickness of about 20 to 50 Angstroms. The magnetization of the free layer 25 is oriented in the x direction under the influence of a longitudinal bias from the adjoining hard bias layers 28 which are magnetized in the x direction. In the bottom spin valve structure, the top portion 26 of the GMR element is comprised of a cap layer that may be Ta. Optionally, the cap layer may be comprised of more than one layer that may be a layer of NiCr on a layer of tantalum oxide, for instance.

In an alternative embodiment that represents a top spin valve, the bottom portion 24 is comprised of a seed layer such as a NiCr layer formed on the first gap layer 23. Optionally, a buffer layer (not shown) such as a layer of Ru is formed on the seed layer or on the first gap layer 23 and a copper layer is formed on the Ru layer to provide a lattice match to the overlying free layer 25. The magnetization and composition of the free layer 25 are the same as described previously. Above the free layer in the top portion 26 are sequentially formed a spacer, a pinned layer which may have a SyAP configuration, an AFM layer, and a cap layer. The aforementioned layers have the same composition and magnetization direction as in the previously described bottom portion of the bottom spin valve structure. The layers in the top portion 26 of the top spin valve embodiment are not shown in order to simplify the drawing and direct attention to the abutting junction formed between the free layer 25 and the hard bias layers 28 on either side of the GMR element. Preferably, the hard bias layers 28 cover a substantial portion of the sidewalls of the GMR element including both sides 25a, 25b of the free layer 25.

It is understood that in the presence of an external magnetic field which can be applied when the magnetic read head 20 is passed over a magnetic recording medium, the magnetization direction in the free layer 25 may be switched to the y direction. The changed magnetic state in the free layer 25 may be sensed by passing a current through the leads 29 to detect a lower resistance in the GMR element when the magnetization of the pinned layer and free layer are both in the y direction.

A key feature of the first embodiment is that the hard bias layers 28 are comprised of a FePtCu alloy that has a composition represented by $(Fe_{1-V}Pt_V)_{1-Y}Cu_Y$ in which v is between about 0.4 and 0.6 and y is from about 0.05 to 0.2. Alternatively, the hard bias layers are comprised of a FePtCuX alloy that has a composition represented by $[(Fe_{1-V}Pt_V)_{1-Y}Cu_Y]_{1-Z}X_Z$ where v is between about 0.4 and 0.6, y is from about 0.05 to 0.2, and z is between about 0.05 and 0.2 and wherein X=B, C, O, Si, or N. The thickness of the hard bias layers 28 is about 50 to 300 Angstroms. Note that no seed layer is required in order for the hard bias layers 28 to achieve a proper ordered structure with the desired magnetic properties. As a result, the magnetic coupling to the adjoining free layer 25 is not diminished by an intermediate layer as in prior art and the hard bias layers 28 have a higher biasing efficiency in maintaining a single magnetic domain in the free layer.

Above the hard bias layers 28 are formed electrical leads 29 on each side of the GMR element. Although the leads 29 are connected to the sides of the GMR element in the top portion 26, the present invention also anticipates an embodiment in which the leads are attached to the top surface 26a of the top portion. The leads may be a composite layer in which a thicker conductive layer such as Au, Cu, Ru, Rh, or Cr is sandwiched between thinner Ta layers. In one embodiment (not shown), the leads 29 are comprised of a 20 to 50 Angstrom thick first Ta layer on the hard bias layers 28, a 300 to 1000 Angstrom thick conductive layer on the first Ta layer, and a 20 to 200 Angstrom thick second Ta layer on the conductive layer. A track width W is defined as the distance between the leads 29 on the top surface 26a of the top portion 26. A second gap layer 30 is disposed on the leads 29 and top portion 26 and a second shield 31 covers the second gap layer 30 to complete the magnetic read head 20. Note that the second shield 31 preferably has a smooth top surface in order to improve the process latitude for subsequent process steps that could involve a write head fabrication as an example.

The advantages of the present invention are summarized in Table 1 below in which a FePtCu hard bias layer according to the present invention is compared to a prior art CoCrPt hard bias layer that was deposited on a 50 Angstrom thick seed layer comprised of Cr and Ti. In both samples, the hard bias layer is formed in a magnetic read head above a first gap (Al$_2$O$_3$) layer. The hard bias layer forms an abutting junction with a free layer comprised of CoFe and NiFe. The novel FePtCu sample was annealed at 280° C. for 5 hours on a substrate in a N$_2$ ambient or in a vacuum under an applied magnetic field of 10000 Oersteds along its x-axis which is parallel to the plane of the substrate and perpendicular to the ABS plane of the read head. Table 1 indicates that the FePtCu hard bias layer of the present invention has more than double the coercivity value of a CoCrPt hard bias layer and also has a higher squareness ratio. Note that the composition of the CoCrPt sample is 79 atomic % Co, 5 at. % Cr, and 16 at. % Pt while the FePtCu sample has 45 at. % Fe, 45 at. % Pt, and 10 at. % Cu.

portion 26. A well known magnetron sputtering process that employs an argon sputtering gas may be used to deposit the layers in the GMR element. Optionally, an IBD method is used to deposit the layers in the GMR element. The combined thickness of the bottom portion 24, free layer 25, and top portion 26 is about 100 to 500 Angstroms. An AFM layer within the top portion 24 or bottom portion 26 is magnetized in a direction perpendicular to the ABS plane by applying a magnetic field while heating the substrate 21 according to a conventional method. An adjacent pinned layer (not shown) is pinned in the same direction as the AFM layer by exchange coupling with the AFM layer.

Next, a photoresist layer 27 is patterned on the top portion 26 of the GMR element by a standard lithographic process. The width w of the resulting photoresist layer 27 is intended to define the width of the top surface 26a of the top portion 26. In one embodiment, the width w subsequently becomes the track width of the magnetic read head 20. Preferably, an undercut is generated at the bottom corners of the photoresist layer 27 by an etch process known to those skilled in the art. The undercut will facilitate a lift-off step at a later stage of the fabrication sequence.

An ion beam etching (IBE) or reactive ion etching (RIE) process is then performed to sequentially etch through exposed regions of the top portion 26, free layer 25, and bottom portion 24. The IBE or RIE process may involve multiple steps with different etch chemistries as appreciated by those skilled in the art in order to efficiently remove all the layers in the GMR stack. The etching process stops on the first gap layer 23 and typically produces sloped sidewalls on the resulting GMR element due to the nature of the etching process. The top portion 26 generally has a smaller width than the bottom portion 24.

A key step in the method of this embodiment is the deposition of a hard bias layer 28 comprised of FePtCu or FePtCuX on the first gap layer 23 and along each side of the GMR element to form an abutting junction between the hard bias layer and both sides of the free layer 25. The thickness of the hard bias layer 28 is between about 50 and 300 Angstroms. In the embodiment where a FePtCu layer is formed, the FePtCu layer has a composition represented by (Fe$_{1-V}$Pt$_V$)$_{1-Y}$Cu$_Y$ in which v is between about 0.4 and 0.6 and y is from about 0.05 to 0.2. Alternatively, the hard bias

TABLE 1

Magnetic Properties of Hard Bias Layers

| Hard Bias Layer | ρ (μohm-cm) | Structure | Mrt (memu/cm$^2$) | Hc (Oe) | S (Mr/Ms) |
|---|---|---|---|---|---|
| CoCrPt | 62 | CrTi 50/CoCrPt 200 | 1.52 | 2030 | 0.89 |
| FePtCu | 75 | FePtCu 200 | 1.29 | 4556 | 0.91 |

The present invention is also a method of forming the magnetic read head of the first embodiment. A partially formed magnetic read head is shown in FIG. 3 which is an intermediate point in the exemplary method of forming the hard bias layer of the present invention.

Referring to FIG. 3, a first shield 22 and a first gap layer 23 are successively formed on a substrate 21 by conventional means. The first gap layer 23 may be comprised of Al$_2$O$_3$. A GMR element comprised of a bottom portion 24, a free layer 25, and a top portion 26 is then fabricated on the first gap layer by sequentially depositing the layers within the bottom portion, the free layer, and the layers in the top layers 28 are comprised of a FePtCuX alloy that has a composition represented by [(Fe$_{1-V}$Pt$_V$)$_{1-Y}$Cu$_Y$]$_{1-Z}$X$_Z$ where v is between about 0.4 and 0.6, y is from about 0.05 to 0.2, and z is between about 0.05 and 0.2 and wherein X=B, C, O, Si, or N. Note that no seed layer is required on the first gap layer 23 before the hard bias layers 28 are deposited which is an advantage in terms of process simplification in addition to improving the magnetic coupling between the hard bias layer and the free layer 25. The hard bias layers 28 are annealed by heating at a temperature of about 260° C. to 300° C. in a N$_2$ ambient or in a vacuum for a period of about 5 to 10 hours while applying a magnetic field of 1000 to 10000 Oe in a direction parallel to the ABS plane and parallel to the substrate surface.

A FePtCu or FePtCuX hard bias layer differs from a conventional CoCrPt hard bias layer in at least one aspect. While a CoCrPt layer relies on a proper microstructure to provide an acceptable Hc value, it is believed that a FePtCu or FePtCuX layer relies on phase transformation through annealing to provide a high Hc value. Thus, a seed layer is typically required to achieve the desired microstructure in an overlying CoCrPt hard bias layer but no seed layer is needed for a FePtCu or FePtCuX hard bias layer Electrical leads 29 are deposited on the hard bias layer 28 by a conventional process. In one embodiment, the leads 29 are comprised of a composite Ta/Au/Ta layer in which a 20 to 50 Angstrom thick first Ta layer is sputter or IBD deposited on the hard bias layers 28, a 400 to 500 Angstrom thick Au layer is sputter or IBD deposited on the first Ta layer, and a 20 to 200 Angstrom thick second Ta layer is sputter or IBD deposited on the Au layer. Although the leads 29 are shown connected to the sides of the top portion 26 of the GMR element, the invention also anticipates a configuration in which the leads are attached to the top surface 26a of the top portion 26.

As depicted in FIG. 3, a hard bias layer 28 and an electrical lead layer 29 are also formed above the photoresist layer 27. Referring again to FIG. 2, the photoresist layer 27 and overlying layers 28, 29 are removed by a well known lift off process to leave the top surface 26a of the top portion 25 exposed between the leads 29. A second gap layer 30 is deposited on the leads 29 and top portion 26 by a method similar to that used to form the first gap layer 23. Subsequently, a second shield 31 is formed on the second gap layer 30 by a method similar to that employed for the formation of the first shield 22.

Figure 4:
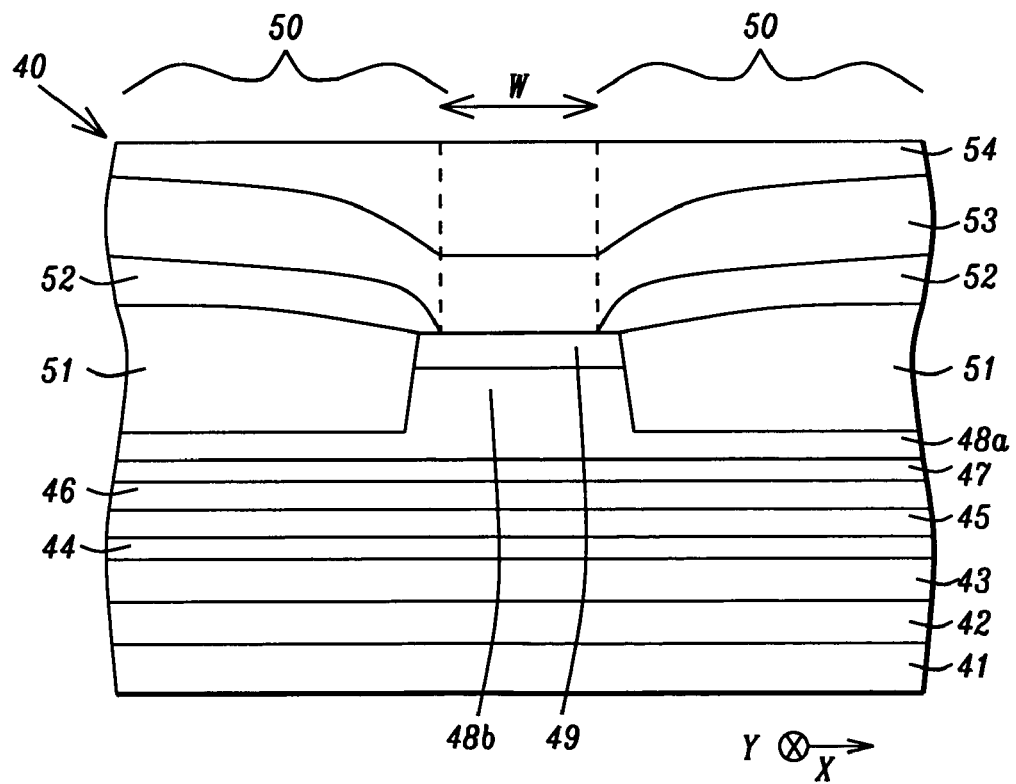
FIG. 4 is a cross-sectional view of a magnetic read head in which a hard bias layer comprised of FePtCu or FePtCuX where x=B, C, O, Si, or N is formed on and adjacent to a free layer in a GMR element according to second embodiment of the present invention.

A second embodiment of the present invention is a magnetic read head shown in FIG. 4 in which a cap layer and an upper portion of a free layer have a first width that is smaller than a second width of a lower portion of the free layer and the remainder of the underlying layers in the bottom spin valve structure. A novel hard bias layer according to the present invention forms an abutting junction along the sidewalls of the upper portion of the free layer and along the top surface of the bottom portion of the free layer.

Referring to FIG. 4, a cross-sectional view from an ABS plane depicts a magnetic read head 40 that has a substrate 41 on which a first shield 42 and a first gap layer 43 are consecutively formed. A GMR element which is a stack of layers that has a bottom spin valve configuration is formed on the first gap layer 43 and has a bottom seed layer 44 which may be NiCr, for example. There is an AFM pinning layer 45 on the seed layer 44 and a pinned layer 46 which may have a SyAP configuration on the AFM layer. The AFM layer 45 is magnetized in the y direction and the pinned layer 46 is pinned in the y direction due to exchange coupling with the AFM layer. A spacer 47 which may be a copper layer is disposed on the pinned layer 46 and separates the pinned layer from an overlying free layer which has a bottom portion 48a and a top portion 48b. The free layer may be comprised of NiFe and/or CoFe and is magnetically aligned in the x direction because of a longitudinal bias from an adjoining hard bias layer 51 which is magnetized in the x direction. Above the upper portion 48b of the free layer is a cap layer 49. The thickness of the GMR stack of layers is about 100 to 500 Angstroms. In one embodiment, the thickness of a hard bias layer 51 is sufficient to cover the entire adjoining side of the upper portion 48b of the free layer and the cap layer 49. Alternatively, a hard bias layer 51 has a thickness that is sufficient to cover a side of the upper portion 48b of the free layer but does not extend to the top surface of the cap layer 49.

Note that the cap layer 49 and upper portion 48b of the free layer have a width that is essentially equivalent to the track width w of the magnetic read head 40 while the lower portion 48a of the free layer and underlying layers 43-47 in the GMR stack extend into the regions 50 and have a width that is larger than a track width w. In this design, the hard bias layer 51 does not contact the pinned layer 46 which thereby prevents the hard bias layer from influencing the magnetization of the pinned layer away from the y direction. A similar magnetic read head with a CoCrPt hard bias layer and underlying seed layer has been disclosed by Headway Technologies, Inc. in U.S. Pat. No. 6,466,418 which is herein incorporated by reference.

A key feature of the second embodiment is that the hard bias layers 51 are comprised of FePtCu or FePtCuX where X=B, C, O, Si, or N. In an embodiment where the hard bias layers 51 are comprised of FePtCu, the FePtCu layer has a composition represented by $(Fe_{1-V}Pt_V)_{1-Y}Cu_Y$ in which v is between about 0.4 and 0.6 and y is from about 0.05 to 0.2. Alternatively, the hard bias layers 51 are comprised of a FePtCuX alloy that has a composition represented by $[(Fe_{1-V}Pt_V)_{1-Y}Cu_Y]_{1-Z}X_Z$ where v is between about 0.4 and 0.6, y is from about 0.05 to 0.2, and z is between about 0.05 and 0.2 An advantage of the hard bias layers 51 of the present invention is that no seed layer is required in order for the hard bias layers to achieve a proper ordered structure with the desired magnetic properties. Instead, a high coercivity Hc and a high squareness S value are achieved by an annealing process. As a result, magnetic coupling to the adjoining upper portion 48b and lower portion 48a of the free layer is not diminished by an intermediate layer as in prior art and the hard bias layers 51 have a higher biasing efficiency in maintaining a single magnetic domain in the free layer. Additionally, a FePtCu or FePtCuX hard bias layer 51 may be formed with a higher coercivity than conventional hard bias layers based on CoCrPt or CoPt. As indicated in Table 1, a FePtCu layer has an Hc more than double that of CoCrPt and a higher S ratio. Thus, the hard bias layers 51 of the second embodiment have a higher efficiency in maintaining the adjoining free layer in a single magnetic domain.

There is an electrical lead 52 formed above each hard bias layer 51 which contacts the top surface of the cap layer 49. In one embodiment (not shown), the leads 52 are a composite layer in which a 20 to 50 Angstrom thick first Ta layer is formed on the hard bias layer 51, a Au or Cu conductive layer having a thickness of about 400 to 500 Angstroms is on the first Ta layer, and a 20 to 200 Angstrom thick second Ta layer is formed on the Au or Cu layer. Alternatively, the conductive layer that is sandwiched between the first and second Ta layers in a lead 52 may be comprised of Rh, Ru, or Cr with a thickness of between 300 and 1000 Angstroms. Optionally, the leads 52 may contact the sides of the cap layer 49 so that the track width w is essentially equivalent to the width of the cap layer. A second gap layer 53 is disposed above the cap layer 49 and leads 52 and a second shield 54 is formed on the second gap layer. Preferably, the second shield has a planar top surface.

Those skilled in the art will appreciate that the magnetic read head 40 may be formed by a similar sequence of steps as previously described for the magnetic read head 20 in the first embodiment except that the etching process that defines the track width in the GMR element stops in the free layer to provide an upper portion 48b having a second width and a lower portion 48a of the free layer that has a first width greater than the second width. Additionally, the deposition of the leads 52 is adjusted to allow a portion of the leads to contact the top surface of the cap layer 49 if so desired.

While this invention has been particularly shown and described with reference to, the preferred embodiment thereof, it will be understood by those skilled in the art that various changes in form and details may be made without departing from the spirit and scope of this invention.

We claim:

1. A longitudinal bias structure for use in a magnetoresistive (MR) based magnetic read head, comprising:
   (a) a substrate upon which a MR element has been formed, said MR element is comprised of sidewalls, a top surface, and a free layer wherein said free layer has two sides coincident with said MR element sidewalls; and
   (b) a FePtCuX hard bias layer formed on said substrate and along the sidewall on either side of said MR element wherein said hard bias layer forms an abutting junction with both sides of said free layer and X=B, C, O, Si, or N.

2. The longitudinal bias structure of claim 1 wherein said MR element is a GMR element with a top spin valve configuration.

3. The longitudinal bias structure of claim 1 wherein said MR element is a GMR element with a bottom spin valve configuration.

4. The longitudinal bias structure of claim 1 wherein the FePtCuX hard bias layer has a composition represented by $[(Fe_{1-V}Pt_V)_{1-Y}Cu_Y]_{1-Z}X_Z$ where v is between about 0.4 and 0.6, y is from about 0.05 to 0.2, and z is between about 0.05 and 0.2.

5. The longitudinal bias structure of claim 1 wherein said FePtCuX hard bias layer has an ordering temperature of less than about 300° C.

6. The longitudinal bias structure of claim 1 wherein said FePtCuX hard bias layer has a coercivity of about 4000 Oe or greater.

7. The longitudinal bias structure of claim 1 wherein said FePtCuX hard bias layer covers a substantial portion of said sidewalls including the entire sides of said free layer and at least a portion of the sidewalls between the free layer and the top surface of said MR element.

8. The longitudinal bias structure of claim 1 wherein an electrical lead is formed on the hard bias layer on each side of said MR element, said electrical lead contacts a portion of said MR element.

9. The longitudinal bias structure of claim 8 wherein said electrical lead is a composite layer comprised of a first Ta layer having a thickness of about 20 to 50 Angstroms formed on said hard bias layer, a conductive layer comprised of Au, Cu, Cr, Ru, or Rh with a thickness of about 300 to 1000 Angstroms on said first Ta layer, and a second Ta layer having a thickness of about 20 to 200 Angstroms on said conductive layer.

10. A magnetic read head having a GMR based configuration, comprising:
    (a) a substrate upon which a GMR element has been formed, said GMR element is comprised of two sidewalls, a top surface, and a free layer wherein said free layer has two sides coincident with said GMR element sidewalls;
    (b) a FePtCuX hard bias layer disposed on said substrate and along both sidewalls of said GMR element wherein said FePtCuX hard bias layer forms an abutting junction with each side of said free layer and X=B, C, O, Si, or N; and
    (c) an electrical lead formed on said FePtCuX hard bias layer on each side of the GMR element that contacts said GMR element such that a space between the electrical leads and above the top surface of said GMR element defines a track width of said magnetic read head.

11. The magnetic read head of claim 10 wherein the substrate is comprised of a top layer which is a first gap layer formed on a first shield of the read head.

12. The magnetic read head of claim 10 wherein the FePtCuX hard bias layer has a composition represented by $[(Fe_{1-V}Pt_V)_{1-Y}Cu_Y]_{1-Z}X_Z$ where v is between about 0.4 and 0.6, y is from about 0.05 to 0.2, and z is between about 0.05 and 0.2.

13. The magnetic read head of claim 10 wherein said FePtCuX hard bias layer has an ordering temperature of less than about 300° C.

14. The magnetic read head of claim 10 wherein said FePtCuX hard bias layer has a coercivity of about 4000 Oe or greater.

15. The magnetic read head of claim 10 wherein said FePtCuX hard bias layer covers a portion of said sidewall between said free layer and a top surface of said GMR element.

16. The magnetic read head of claim 10 wherein the FePtCuX hard bias layer has a thickness that is less than the thickness of said GMR element and the electrical leads contact the sidewalls of said GMR element above said free layer.

17. The magnetic read head of claim 10 further comprised of a second gap layer formed on said electrical leads and on the top surface of said GMR element, and a second shield formed on the second gap layer.

18. A magnetic read head based on a GMR bottom spin valve configuration, comprising:
    (a) a substrate upon which a GMR element has been formed along an ABS plane, said GMR element is comprised of:
       (1) a bottom portion having a first width in which a seed layer, an AFM layer, a pinned layer, a spacer, and a bottom portion of a free layer have been sequentially formed on said substrate; and
       (2) an upper portion that has two sidewalls, a top surface, and a second width and which is comprised of an upper portion of said free layer and an overlying cap layer wherein said second width is less than said first width;
    (b) a FePtCuX hard bias layer disposed on said lower portion of said free layer and along both sidewalls of the upper portion of said free layer wherein said FePtCuX hard bias layer forms an abutting junction with each sidewall of said upper portion of free layer and X=B, C, O, Si, or N; and
    (c) an electrical lead formed on said FePtCuX hard bias layer that contacts said top surface of said GMR element adjacent to each sidewall such that a space between the electrical leads and above the top surface of said GMR element defines the track width of said magnetic read head.

19. The magnetic read head of claim 18 wherein said pinned layer is pinned in a direction that is parallel to the top surface of said GMR element and perpendicular to said ABS plane.

20. The magnetic read head of claim 18 wherein said FePtCuX hard bias layer provides a longitudinal bias to the free layer in a direction that is parallel to the top surface of the GMR element and parallel to said ABS plane.

21. The magnetic read head of claim 18 wherein the FePtCuX hard bias layer has a composition represented by $[(Fe_{1-V}Pt_V)_{1-Y}Cu_Y]_{1-Z}X_Z$ where v is between about 0.4 and 0.6, y is from about 0.05 to 0.2, and z is between about 0.05 and 0.2.

22. The magnetic read head of claim 18 wherein said FePtCuX hard bias layer has an ordering temperature of less than about 300° C.

23. The magnetic read head of claim 18 wherein said FePtCuX hard bias layer has a coercivity of about 4000 Oe or greater.

24. The magnetic read head of claim 18 wherein said FePtCuX hard bias layer covers essentially both sidewalls on the upper portion of said GMR element.

* * * * *